(12) United States Patent
Guan et al.

(10) Patent No.: US 11,388,511 B2
(45) Date of Patent: Jul. 12, 2022

(54) HYDROPHONE FAIRING

(71) Applicant: Dalian University of Technology, Dalian (CN)

(72) Inventors: Guan Guan, Dalian (CN); Xiaole Yang, Dalian (CN); Yunlong Wang, Dalian (CN); Chaoguang Jin, Dalian (CN); Ming Chen, Dalian (CN); Lei Wang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 293 days.

(21) Appl. No.: 16/880,964

(22) Filed: May 21, 2020

(65) Prior Publication Data

US 2021/0088683 A1 Mar. 25, 2021

(30) Foreign Application Priority Data

Sep. 25, 2019 (CN) .......................... 201910909808.4

(51) Int. Cl.
| | | |
|---|---|---|
| *H04R 1/44* | (2006.01) | |
| *G01V 1/38* | (2006.01) | |
| *G01V 1/18* | (2006.01) | |
| *B63B 21/66* | (2006.01) | |

(52) U.S. Cl.
CPC ............... *H04R 1/44* (2013.01); *B63B 21/66* (2013.01); *G01V 1/186* (2013.01)

(58) Field of Classification Search
CPC ........... H04R 1/44; B63B 21/66; G01V 1/186
See application file for complete search history.

(56) References Cited

U.S. PATENT DOCUMENTS

| | | | | |
|---|---|---|---|---|
| 3,611,976 A | * | 10/1971 | Hale | B63B 21/663 114/243 |
| 3,962,982 A | * | 6/1976 | Marchay | B63B 21/663 114/243 |
| 3,990,035 A | * | 11/1976 | Byers | G10K 11/006 367/141 |
| 4,365,574 A | * | 12/1982 | Norminton | B63B 21/663 405/211 |
| 5,335,620 A | * | 8/1994 | Small | B63B 21/663 114/244 |
| 8,851,005 B2 | * | 10/2014 | Tonchia | G01V 1/38 114/243 |
| 10,427,759 B2 | * | 10/2019 | Nielsen | B63B 21/66 |
| 2013/0014685 A1 | * | 1/2013 | Tonchia | G01V 1/38 29/428 |

(Continued)

*Primary Examiner* — Ian J Lobo
(74) *Attorney, Agent, or Firm* — Matthias Scholl P.C.; Matthias Scholl

(57) ABSTRACT

A hydrophone fairing, including: an airfoil-shaped streamline structure having a first half-shell and a second half-shell; a roof plate; and a base plate. The roof plate and the base plate are disposed on two ends of the airfoil-shaped streamline structure, respectively. The first half-shell includes an inner wall provided with a first stiffener, a first support, a second support, a first division plate, and a second division plate which are successively disposed on the inner wall along the direction from the roof plate to the base plate. The altitudes of the first support and the second support are identical relative to the roof plate or the base plate. The roof plate includes a first end and a second end, and the first end includes a first hole to which a rope is attached.

5 Claims, 7 Drawing Sheets

(56) References Cited

U.S. PATENT DOCUMENTS

2018/0079471 A1* 3/2018 MacQuin .............. B63B 21/663
2020/0183038 A1* 6/2020 Brurok ................. G01V 1/3817
2020/0183039 A1* 6/2020 Brurok ................. G01V 1/3817

* cited by examiner

HYDROPHONE FAIRING

CROSS-REFERENCE TO RELAYED APPLICATIONS

Pursuant to 35 U.S.C. § 119 and the Paris Convention Treaty, this application claims foreign priority to Chinese Patent Application No. 201910909808.4 filed Sep. 25, 2019, the contents of which, including any intervening amendments thereto, are incorporated herein by reference.

BACKGROUND

The disclosure relates to a hydrophone fairing.

A hydrophone is a microphone used for collecting underwater sound. The known hydrophones are lowered into deep sea to perform measurement work without protective means.

SUMMARY

The disclosure provides a hydrophone fairing, comprising an airfoil-shaped streamline structure comprising a first half-shell and a second half-shell, a roof plate, and a base plate.

The roof plate and the base plate are disposed on two ends of the airfoil-shaped streamline structure, respectively; the first half-shell comprises an inner wall provided with a first stiffener, a first support, a second support, a first division plate, and a second division plate which are successively disposed on the inner wall along a direction from the roof plate to the base plate; altitudes of the first support and the second support are identical relative to the roof plate or the base plate; the roof plate comprises a first end and a second end, and the first end comprises a first hole to which a rope is attached.

The airfoil-shaped streamline structure comprises a head end and a tail end; the first end of the roof plate extends out of the head end; a first bracket is fixed on the head end and supports the first end of the roof plate; the first half-shell further comprises a first vent hole, a second vent hole, and a water inlet successively disposed on the tail end of the airfoil-shaped streamline structure along the direction from the roof plate to the base plate; the base plate comprises a first end and a second end, and the first end comprises a second hole to which a rope is attached; the first end of the base plate extends out of the head end of the airfoil-shaped streamline structure; a second bracket is fixed on the head end and abuts against the first end of the base plate.

The first division plate comprises a first semioval hole for receiving an upper part of a battery, a second semioval hole for receiving an upper part of a depth sensor, and a plurality of first fixing plates for binding upper parts of the battery and the depth sensor on the first division plate; the second division plate comprises a third semioval hole for receiving a lower part of the battery, a fourth semioval hole for receiving a lower part of the depth sensor, a first semicircular hole, a second semicircular hole for receiving a hydrophone, a plurality of second fixing plates for binding lower parts of the battery and the depth sensor on the second division plate, a third bracket, and a fourth bracket.

The base plate further comprises a third fixing plate for fixing the hydrophone and a circular hole out of which a detector of the hydrophone is exposed; the second half-shell comprises an inner wall provided with a second stiffener, a third stiffener, a fourth stiffener, and a fifth stiffener which are successively disposed on the inner wall along the direction from the roof plate to the base plate.

The second stiffener comprises a plurality of first through holes; the second stiffener is fixed on the roof plate through bolts disposed in the plurality of first through holes; the fifth stiffener comprises a plurality of second through holes; the fifth stiffener is fixed on the base plate through bolts disposed in the plurality of second through holes; the plurality of first fixing plates each is provided with a first steel belt for binding the battery and the depth sensor; the plurality of second fixing plates each is provided with a second steel belt for binding the battery and the depth sensor; and the third fixing plate is provided with a second steel belt for binding the hydrophone.

The outer edges of the roof plate and the base plate extend beyond an upper end face and a lower end face of the airfoil-shaped streamline structure, respectively.

The roof plate is bilaterally symmetrical with respect to a first connection line of the first end and the second end of the roof plate; the base plate is bilaterally symmetrical with respect to a second connection line of the first end and the second end of the base plate; the plurality of first fixing plates, the plurality of second fixing plates and the third fixing plate are disposed on a plane formed by the first connection line of the roof plate and the second connection line of the base plate.

The first steel belt, the second steel belt, and the third steel belt are disposed in a cavity of the second half-shell.

The airfoil-shaped streamline structure, the roof plate and the base plate employ stainless steel or glass fiber reinforced plastics.

Figure 1:
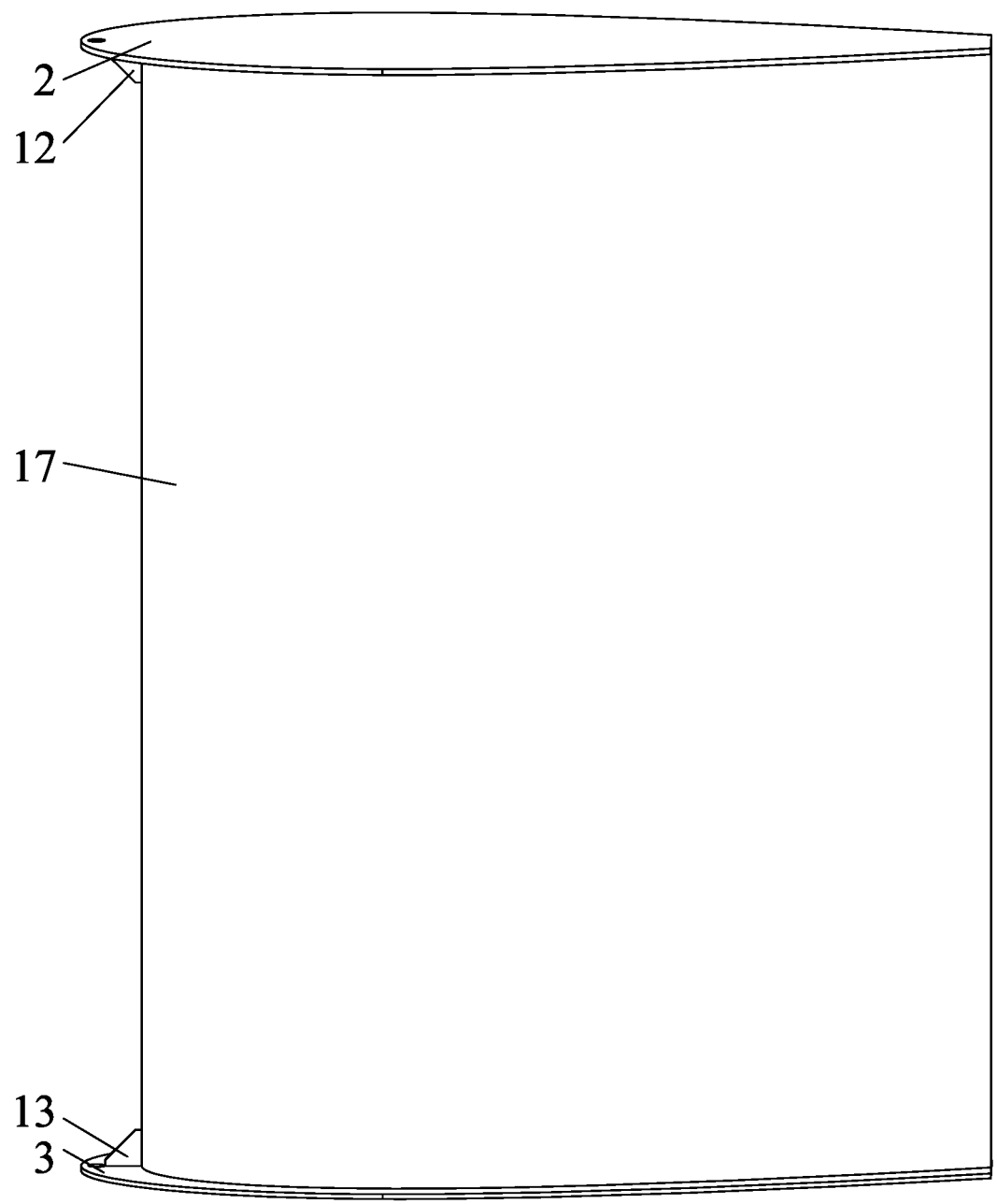
FIG. 1 is a front view of a hydrophone fairing according to one embodiment of the disclosure.
Figure 2:
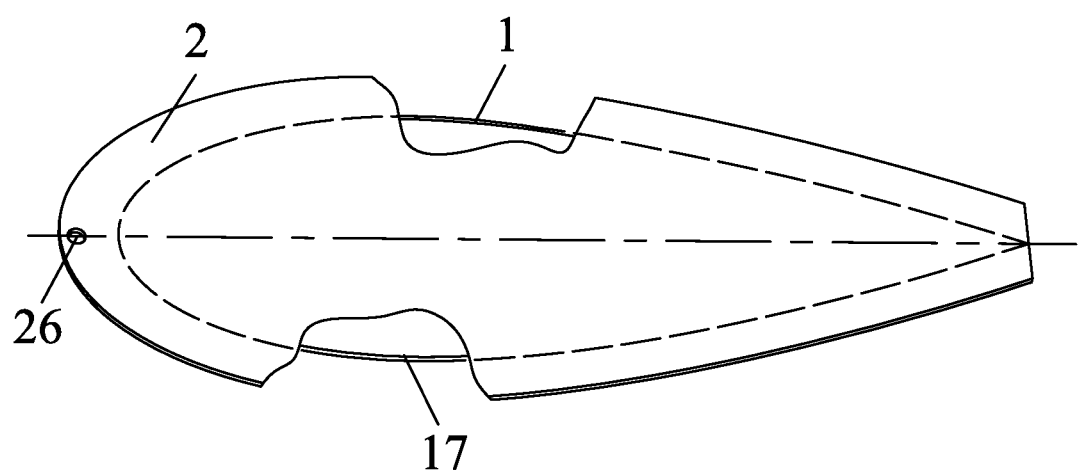
FIG. 2 is a top view of a hydrophone fairing according to one embodiment of the disclosure.
Figure 3:
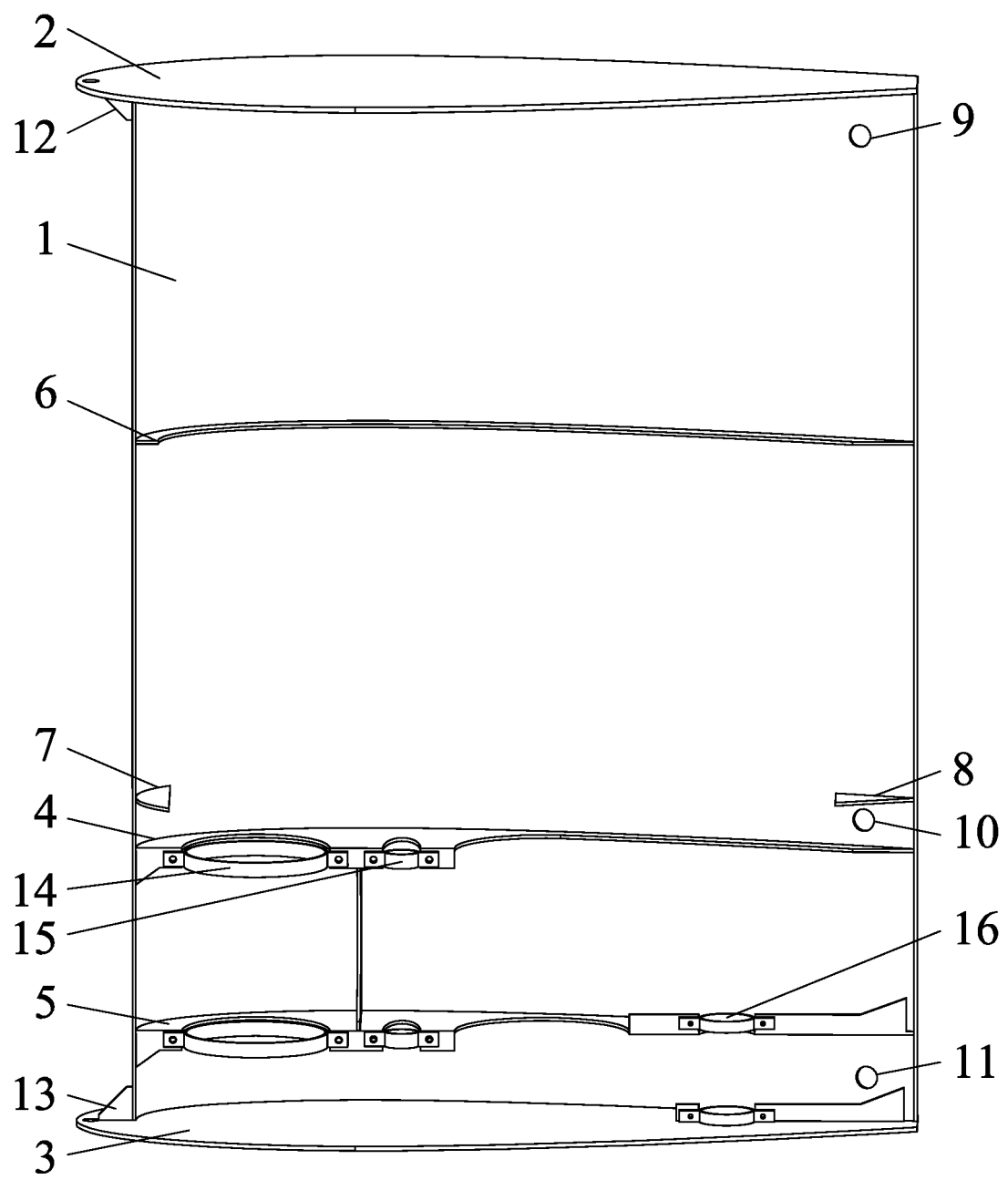
FIG. 3 is a front view of a first half-shell of a hydrophone fairing according to one embodiment of the disclosure.
Figure 4:
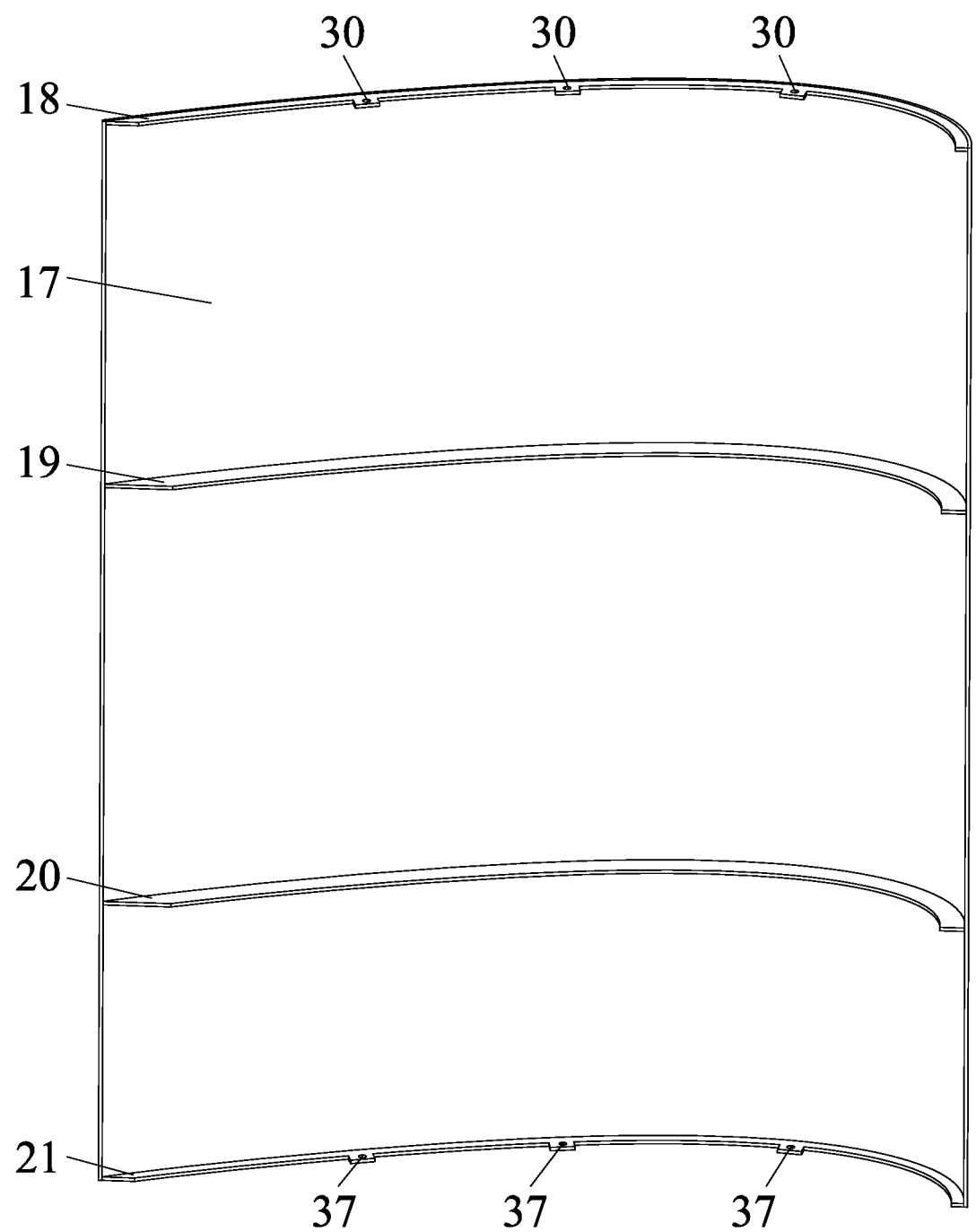
FIG. 4 is a front view of a second half-shell of a hydrophone fairing according to one embodiment of the disclosure.

In the drawings, the following number references are used: 1. First half-shell; 2. Roof plate; 3. Base plate; 4. First division plate; 5. Second division plate; 6. First stiffener; 7. First support; 8. Second support; 9. First vent hole; 10. Second vent hole; 11. Water inlet; 12. First bracket; 13. Second bracket; 14. First steel belt; 15. Second steel belt; 16. First stiffener; 17. Second half-shell; 18. Second stiffener; 19. Third stiffener; 20. Fourth stiffener; 21. Fifth stiffener; 22. First fixing plate; 23. Second fixing plate; 24. Third bracket; 25. Fourth bracket; 26. First hole; 27. Second hole; 28. Third fixing plate; 29. Circular hole; 30. First through holes; 31. First semioval hole; 32. Second semioval hole; 33. Third semioval hole; 34. Fourth semioval hole; 35. First semicircular hole; 36. Second semicircular hole; 37. Second through hole.

DETAILED DESCRIPTION

To further illustrate, embodiments detailing a hydrophone fairing are described below. It should be noted that the following embodiments are intended to describe and not to limit the disclosure.

Figure 5:
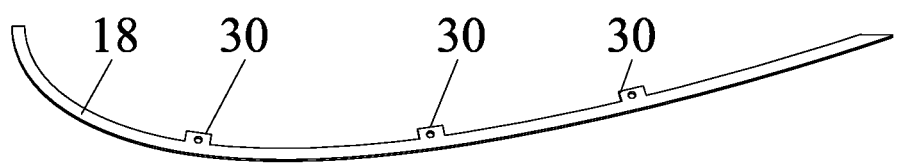
FIG. 5 is a schematic diagram of a second stiffener in FIG. 4.
Figure 6:
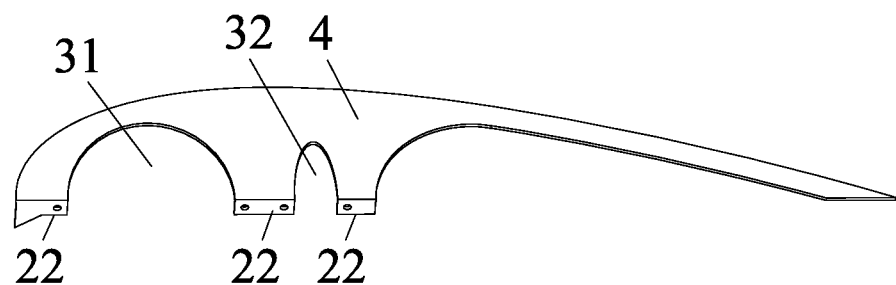
FIG. 6 is a schematic diagram of a first division plate in FIG. 3.
Figure 7:
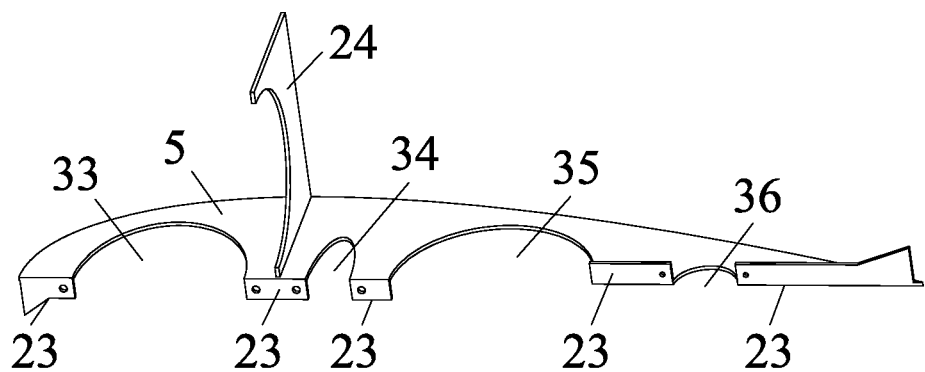
FIG. 7 is a front view of a second division plate in FIG. 3.
Figure 8:
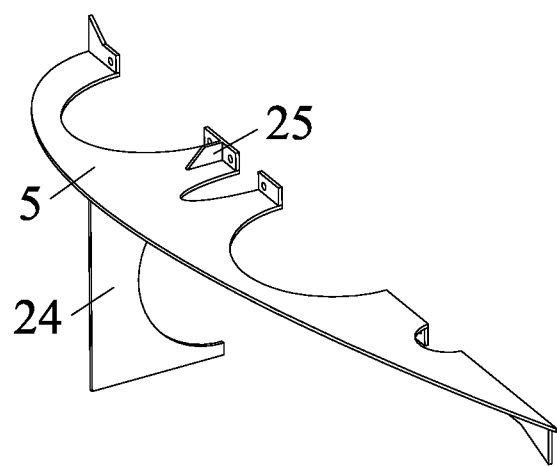
FIG. 8 is a rear view of a second division plate in FIG. 3.
Figure 9:
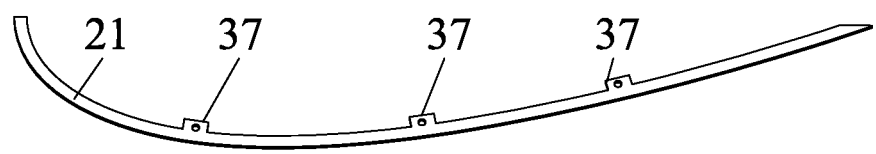
FIG. 9 is a schematic diagram of a fifth stiffener in FIG. 4.
Figure 10:
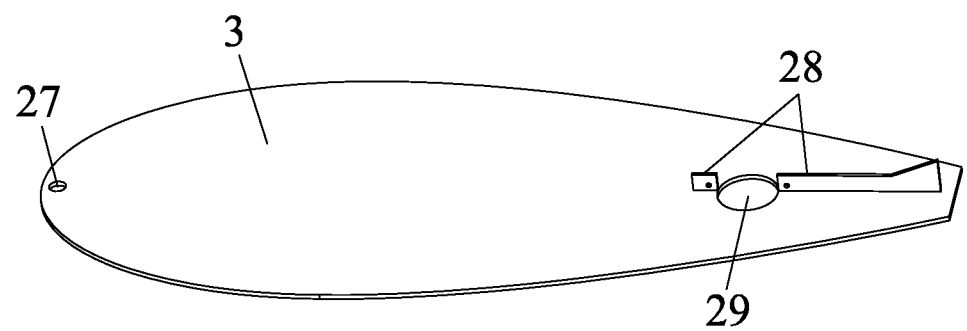
FIG. 10 is a schematic diagram of a base plate in FIG. 3.

As shown in FIGS. 1-4, provided is a hydrophone fairing which can be used in deep seas, and the hydrophone fairing comprises an airfoil-shaped streamline structure comprising a first half-shell 1 and a second half-shell 17, a roof plate 2; and a base plate 3. The roof plate 2 and the base plate 3 are disposed on two ends of the airfoil-shaped streamline structure, respectively; the first half-shell 1 comprises an inner wall provided with a first stiffener 6, a first support 7, a second support 8, a first division plate 4, and a second division plate 5 which are successively disposed on the inner wall along a direction from the roof plate 2 to the base plate 3; altitudes of the first support 7 and the second support 8 are identical relative to the roof plate 2 or the base plate 3; the roof plate 2 comprises a first end and a second end, and the first end comprises a first hole 26 to which a rope is attached; the airfoil-shaped streamline structure comprises a head end and a tail end; the first end of the roof plate 2 extends out of the head end; a first bracket 12 is fixed on the head end and supports the first end of the roof plate 2; the first half-shell 1 further comprises a first vent hole 9, a second vent hole 10, and a water inlet 11 successively disposed on the tail end of the airfoil-shaped streamline structure along the direction from the roof plate 2 to the base plate 3; the base plate 3 comprises a first end and a second end, and the first end comprises a second hole 26 to which a rope is attached; the first end of the base plate 3 extends out of the head end of the airfoil-shaped streamline structure; a second bracket 13 is fixed on the head end and abuts against the first end of the base plate 3; the first division plate 4 comprises a first semioval hole 31 for receiving an upper part of a battery, a second semioval hole 32 for receiving an upper part of a depth sensor, and a plurality of first fixing plates 22 for binding upper parts of the battery and the depth sensor on the first division plate 4 (as shown in FIG. 6); the second division plate 5 comprises a third semioval hole 33 for receiving a lower part of the battery, a fourth semioval hole 34 for receiving a lower part of the depth sensor, a first semicircular hole 35, a second semicircular hole 36 for receiving a hydrophone, a plurality of second fixing plates 23 for binding lower parts of the battery and the depth sensor on the second division plate 5, a third bracket 24, and a fourth bracket 25 (as shown in FIGS. 7 and 8); the base plate 3 further comprises a third fixing plate 28 for fixing the hydrophone and a circular hole 29 out of which a detector of the hydrophone is exposed; the second half-shell 17 comprises an inner wall provided with a second stiffener 18, a third stiffener 19, a fourth stiffener 20, and a fifth stiffener 21 which are successively disposed on the inner wall along the direction from the roof plate 2 to the base plate 3; the second stiffener 18 comprises a plurality of first through holes 30; the second stiffener 18 is fixed on the roof plate 2 through bolts disposed in the plurality of first through holes 30 (as shown in FIG. 5); the fifth stiffener 21 comprises a plurality of second through holes 37 (as shown in FIG. 9); the fifth stiffener 21 is fixed on the base plate 3 through bolts disposed in the plurality of second through holes 37; the plurality of first fixing plates 22 each is provided with a first steel belt 14 for binding the battery and the depth sensor; the plurality of second fixing plates 23 each is provided with a second steel belt 15 for binding the battery and the depth sensor; and the third fixing plate 28 is provided with a first stiffener 16 for binding the hydrophone.

The outer edges of the roof plate 2 and the base plate 3 extend beyond the upper end face and the lower end face of the airfoil-shaped streamline structure, respectively.

The roof plate 2 is bilaterally symmetrical with respect to a first connection line of the first end and the second end of the roof plate 2; the base plate 3 is bilaterally symmetrical with respect to a second connection line of the first end and the second end of the base plate 3; the plurality of first fixing plates 22, the plurality of second fixing plates 23 and the third fixing plate 28 are disposed on a plane formed by the first connection line of the roof plate 2 and the second connection line of the base plate 3.

The first steel belt 14, the second steel belt 15, and the first stiffener 16 are disposed in a cavity of the second half-shell 17.

The top plate 2 comprises the first hole 26, and the base plate 3 comprises the second hole 27 and the circular hole 29. Ropes can be attached to the first hole 26 and the second hole 27, thus facilitating the dragging of the hydrophone fairing. The detector of the hydrophone can be easily exposed of the circular hole 29, thus ensuring the operation of the hydrophone in the sea water.

The design of the first semicircular hole 35 reduces the weight of the second division plate 5. The third bracket 24 and the fourth bracket 25 improves the structural strength of the first division plate 4 and the second division plate 5.

The plurality of first fixing plates 22 each provided with the first steel belt 14, the plurality of second fixing plates 23 each provided with the second steel belt 15, and the third fixing plate 28 provided with the first stiffener 16 can effectively fix the battery, the depth sensor, and the hydrophone. Regulating the positions of the fixing plates and the holes can change the mounting positions of the battery and the depth sensor, so that the floating center and gravity center of the hydrophone fairing and the depth sensor equipment (battery, depth sensor) are vertically in a straight line, to achieve the balance of the hydrophone fairing in the water. The plurality of first fixing plates 22, the plurality of second fixing plates 23 and the third fixing plate 28 are disposed on the bilaterally symmetrical plane of the roof plate 2 and the base plate 3. Because the fixing plates are provided with the steel belts, the centers of gravity of the battery, the depth sensor and the hydrophone deviate from the bilaterally symmetrical plane, which can offset the imbalance of the transverse center of gravity of the hydrophone fairing caused by the asymmetrical distribution of the structural elements of the hydrophone fairing.

The first division plate 4 comprises the first semioval hole 31 for receiving the upper part of the battery, the second semioval hole 32 for receiving the upper part of the depth sensor. The second division plate 5 comprises the third semioval hole 33 for receiving the lower part of the battery, the fourth semioval hole 34 for receiving the lower part of the depth sensor. The elliptical holes can avoid the contact of the edge of the battery or depth sensor with two division plates, so as to avoid the impact of the vibration of the battery or depth sensor on the detection of the hydrophone.

The second stiffener 18 and the fifth stiffener 21 can prevent the deformation of the two ends of the second half-shell 17. The bolts passing through the through holes on the second stiffener 18 and the fifth stiffener 21 can fix the first half-shell 1 and the second half-shell 17.

The hydrophone fairing is made of stainless steel or glass fiber reinforced plastic, thus improving the corrosion resistance of the hydrophone fairing. The inner part of the hydrophone fairing is equipped with reinforcing ribs, which can effectively increase the structural strength of the hydrophone fairing, and is durable and not easy to deform.

The first half-shell 1 and the second half-shell 17 constitute an airfoil-shaped streamline structure. The slender wing shape can effectively avoid the influence of the turbulent flow field on the detection of the hydrophone.

The inner wall of the first half-shell comprises the first support 7 and the second support 8. The space between the two supports and the top plate 2 can accommodate the solid deep-sea pressure resistant buoyancy material to provide buoyancy for the entire fairing.

The hydrophone fairing is made of stainless steel or glass fiber reinforced plastic, which can reduce the corrosion thereof caused by sea water. The fixing plates and holes on the two division plates can fix, protect, reduce weight and balance the buoyancy of the hydrophone fairing. The circular hole 29 of the base plate allows the detector of the hydrophone to extend out of the fairing to work. The hydrophone faring comprises the first half-shell and the second half-shell, and is easy to assemble. The stiffener and the brackets can increase the structural strength of the hydrophone faring.

It will be obvious to those skilled in the art that changes and modifications may be made, and therefore, the aim in the appended claims is to cover all such changes and modifications.

What is claimed is:

1. A device, comprising:
   an airfoil-shaped streamline structure comprising a first half-shell and a second half-shell;
   a roof plate; and
   a base plate;
   wherein:
   the roof plate and the base plate are disposed on two ends of the airfoil-shaped streamline structure, respectively;
   the first half-shell comprises an inner wall provided with a first stiffener, a first support, a second support, a first division plate, and a second division plate which are successively disposed on the inner wall along a direction from the roof plate to the base plate; altitudes of the first support and the second support are identical relative to the roof plate or the base plate;
   the roof plate comprises a first end and a second end, and the first end comprises a first hole to which a rope is attached;
   the airfoil-shaped streamline structure comprises a head end and a tail end; the first end of the roof plate extends out of the head end; a first bracket is fixed on the head end and supports the first end of the roof plate;
   the first half-shell further comprises a first vent hole, a second vent hole, and a water inlet successively disposed on the tail end of the airfoil-shaped streamline structure along the direction from the roof plate to the base plate;
   the base plate comprises a first end and a second end, and the first end comprises a second hole to which a rope is attached; the first end of the base plate extends out of the head end of the airfoil-shaped streamline structure;
   a second bracket is fixed on the head end and abuts against the first end of the base plate;
   the first division plate comprises a first semioval hole for receiving an upper part of a battery, a second semioval hole for receiving an upper part of a depth sensor, and a plurality of first fixing plates for binding upper parts of the battery and the depth sensor on the first division plate;
   the second division plate comprises a third semioval hole for receiving a lower part of the battery, a fourth semioval hole for receiving a lower part of the depth sensor, a first semicircular hole, a second semicircular hole for receiving a hydrophone, a plurality of second fixing plates for binding lower parts of the battery and the depth sensor on the second division plate, a third bracket, and a fourth bracket;
   the base plate further comprises a third fixing plate for fixing a hydrophone and a circular hole out of which a detector of the hydrophone is exposed;
   the second half-shell comprises an inner wall provided with a second stiffener, a third stiffener, a fourth stiffener, and a fifth stiffener which are successively disposed on the inner wall along the direction from the roof plate to the base plate;
   the second stiffener comprises a plurality of first through holes; the second stiffener is fixed on the roof plate through bolts disposed in the plurality of first through holes; the fifth stiffener comprises a plurality of second through holes; the fifth stiffener is fixed on the base plate through bolts disposed in the plurality of second through holes; and
   the plurality of first fixing plates each is provided with a first steel belt for binding the battery and the depth sensor; the plurality of second fixing plates each is provided with a second steel belt for binding the battery and the depth sensor; and the third fixing plate is provided with a second steel belt for binding the hydrophone.

2. The device of claim 1, wherein outer edges of the roof plate and the base plate extend beyond an upper end face and a lower end face of the airfoil-shaped streamline structure, respectively.

3. The device of claim 1, wherein the roof plate is bilaterally symmetrical with respect to a first connection line of the first end and the second end of the roof plate; the base plate is bilaterally symmetrical with respect to a second connection line of the first end and the second end of the base plate; the plurality of first fixing plates, the plurality of second fixing plates and the third fixing plate are disposed on a plane formed by the first connection line of the roof plate and the second connection line of the base plate.

4. The device of claim 1, wherein the first steel belt, the second steel belt, and the third steel belt are disposed in a cavity of the second half-shell.

5. The device of claim 1, wherein the airfoil-shaped streamline structure, the roof plate and the base plate employ stainless steel or glass fiber reinforced plastics.

* * * * *